(12) United States Patent
Nishigaki et al.

(10) Patent No.: US 6,837,215 B2
(45) Date of Patent: Jan. 4, 2005

(54) AUTOMOBILE AND CONTROLLING METHOD FOR AUTOMOBILE

(75) Inventors: Takahiro Nishigaki, Nisshin (JP);
Katsuhiko Yamaguchi, Nisshin (JP);
Yukio Kobayashi, Kasugai (JP);
Osamu Harada, Toyota (JP);
Kiyoshiro Ueoka, Nisshin (JP);
Mamoru Tomatsuri, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/674,543

(22) Filed: Oct. 1, 2003

(65) Prior Publication Data
US 2004/0123836 A1 Jul. 1, 2004

(30) Foreign Application Priority Data
Oct. 25, 2002 (JP) ........................................ 2002-311173

(51) Int. Cl.$^7$ .............................................. F02D 31/00
(52) U.S. Cl. ........................ 123/352; 123/361; 180/65.2
(58) Field of Search ................................. 123/352, 361; 180/65.2

(56) References Cited

U.S. PATENT DOCUMENTS 6,208,034 B1 * 3/2001 Yamaguchi ............... 290/40 C
6,242,873 B1 * 6/2001 Drozdz et al. ............... 318/139
6,269,290 B1 * 7/2001 Egami et al. .................. 701/22
6,563,230 B2 * 5/2003 Nada ......................... 290/40 C
6,784,563 B2 * 8/2004 Nada ......................... 290/40 C

FOREIGN PATENT DOCUMENTS

| JP | 2001-16705 A | 1/2001 |
| JP | 2001-20771 A | 1/2001 |
| JP | 2001-298805 A | 10/2001 |

* cited by examiner

Primary Examiner—John T. Kwon
(74) Attorney, Agent, or Firm—Kenyon & Kenyon (57) ABSTRACT

A hybrid automobile runs by transmitting a power from an engine and a power from a motor-generator MG2, and can store a part of the power from the engine and an electric power generated by a motor-generator MG1. In this hybrid automobile, a power requirement Pr* of a drive shaft is set based on an accelerator opening, and a battery charge electric power Pbi is set based on SOC, and the sum of the power requirement Pr* and the battery charge electric power Pbi are set as an engine target power Pe*. When the engine target power Pe* is less than a predetermined minimum value Plow, the engine target power Pe* is changed to the minimum value Plow. Further, in accordance with this change, the battery charge electric power Pbi is also changed, and the engine and the motor-generators MG1, MG2 are operated. Since the minimum value Plow is set to be a value such that the efficiency with respect to the output of the engine becomes optimal, it is possible to prevent the engine from being operated in a low output region where the efficiency is low.

19 Claims, 7 Drawing Sheets

AUTOMOBILE AND CONTROLLING METHOD FOR AUTOMOBILE

INCORPORATION BY REFERENCE

The disclosure of Japanese Patent Application No. 2002-311173 filed on Oct. 25, 2002, including its specification, drawings and abstract, is incorporated herein by reference in its entirety.

BACKGROUND OF THE INVENTION

1. Field of the Invention

The invention relates to an automobile and method for the automobile, and more particularly to an automobile and method for the automobile provided with an internal combustion engine capable of outputting power to a drive shaft.

2. Description of the Related Art

As an example of this kind of automobile, an automobile is proposed which is running utilizing power from an internal combustion engine and power from an electric motor, and in which a part of the power from the internal combustion engine is converted into electric power so as to charge a battery. In this automobile, the internal combustion engine and the electric motor are controlled such that while outputting power equivalent to a power requirement to a drive shaft, a charge amount of the battery increases when the automobile is in such a running state that an increased amount of charged electric power of the battery per increase amount of a unit fuel of the internal combustion engine increases. Accordingly, it is possible to reduce fuel consumption of the internal combustion engine with respect to the charge amount of the battery, thereby improving fuel economy, compared to an automobile that controls the charge amount of the battery merely in accordance with a state of charge SOC of the battery.

However, with an automobile such as disclosed in Japanese Patent Application Laid-Open No. 2001-298805, the internal combustion engine is sometimes operated in a low output region where operation efficiency (i.e. fuel economy) of the internal combustion engine is low, although the operation efficiency depends to some extent on a capacity and performance of the electric motor to be used. That is, when the output in the low output region where the operation efficiency is low cannot be supplemented by the output from the electric motor, the operation efficiency of the internal combustion engine may further decrease. Further, it is likely that the efficiency change with respect to the output change is large in the low output region of the internal combustion engine. Therefore, when operating the internal combustion engine while taking into consideration the electric charge to the battery, the output change of the internal combustion engine becomes greater, and thus the efficiency change of the internal combustion engine becomes greater. This may lead to unstable fuel consumption.

SUMMARY OF THE INVENTION

It is an object of the invention to improve or stabilize fuel economy of an automobile.

An automobile according to an aspect of the invention includes an internal combustion engine capable of outputting power to a drive shaft. The automobile includes a target power setting device, an operation control device, and a power input/output/consumption device. The target power setting device sets a target power which should be output by the internal combustion engine or a target operating point, based on a power requirement to be output to the drive shaft and characteristic of the efficiency with respect to the output of the internal combustion engine. The operation control device controls the operation of the internal combustion engine such that the internal combustion engine is operated with the target power or the target operating point that has been set. A power input/output/consumption device inputs, outputs, or consumes power equivalent to a difference between the power requirement and either one of the target power and a power corresponding to the target operating point.

In an automobile according to this aspect, the target power which should be output by the internal combustion engine and the target operating point are set based on the power requirement to be output to the drive shaft and characteristic of the efficiency with respect to the output of the internal combustion engine. Further, operation of the internal combustion engine is controlled such that the internal combustion engine is operated with the target power or at the target operating point that has been set. Further, a power equivalent to a difference between the power requirement to be output to the drive shaft and either one of the target power that has been set and a power corresponding to the target operating point that has been set is input/output, or consumed. Accordingly, it is possible to set the target power or the target operating point of the internal combustion engine based on the power requirement to be output to the drive shaft, while considering characteristic of the efficiency with respect to the output of the internal combustion engine. Therefore, it is possible to operate the internal combustion engine, thereby improving fuel economy of the automobile.

In an automobile according to the aspect, the power input/output/consumption device may be configured by an auxiliary device and an auxiliary device control device. The auxiliary device is operated by using at least a part of the power from the internal combustion engine directly or indirectly. Further, the auxiliary device controls operation of the auxiliary device. Accordingly, it is possible to operate the auxiliary device using a power equivalent to a difference between the power requirement and either one of the target power and the power corresponding to the target operating point.

Further, in an automobile according to the aspect, the target power setting device may set the target power or the target operating point based on a operation requirement of the auxiliary device. Accordingly, it is possible to operate the internal combustion engine efficiently, while taking into consideration the operation requirement of the auxiliary device.

Moreover, the target power setting device may set the target power or the target operating point such that the efficiency with respect to the output of the internal combustion engine is within a predetermined tolerance. Accordingly, the efficiency of an internal combustion engine can be further improved.

Further, according to the aspect, the target power setting device may set the target power or the target operating point, based on characteristic of the efficiency change with respect to the output change of the internal combustion engine, as the characteristic of the efficiency with respect to the output of the internal combustion engine. Accordingly, it is possible to obtain more appropriate efficiency change with respect to the output change of the internal combustion engine.

In an automobile according to the invention which sets the target power based on characteristic of the efficiency change with respect to the output change of the internal combustion engine, the target power setting device may set the target power or the target operating point such that the internal combustion engine is operated in an output range where the degree of the efficiency change with respect to the output change of the internal combustion engine is small. Accordingly, fuel economy of the internal combustion engine can be stabilized.

Further, the target power or the target operating point are set based on characteristic of the efficiency change with respect to the output change of the internal combustion engine in some automobiles according to the invention. In this case, the target power setting device may set a predetermined power or a predetermined operating point as the target power regardless of the power requirement, when the target output that has been set based on the power requirement or the power corresponding to the target operating point that has been set is within an output range where the degree of the efficiency change with respect to the output change of the internal combustion engine is large. Accordingly, fuel economy of the internal combustion engine is further stabilized regardless of the power requirement. Further, the target power is set based on the power requirement and the operation requirement of the auxiliary device in some automobiles according to the invention. In this case, the target power setting device may set a predetermined power or a predetermined operating point regardless of the power requirement, when the target output that has been set based on the power requirement and the operation request of the auxiliary device or the power corresponding to the target operating point that has been set is within an output range where the degree of the efficiency change with respect to the output change of the internal combustion engine is large. Accordingly, fuel economy of the internal combustion engine can be further stabilized regardless of the power requirement and the operation requirement of the auxiliary device. Furthermore, a predetermined power or a predetermined operating point are set in some automobiles according to the invention. In this case, the predetermined power or the predetermined operating point may be a power or an operating point when the efficiency of the internal combustion engine is a predetermined power at a point where the efficiency of the internal combustion engine has reached a predetermined high level. Accordingly, the efficiency of the internal combustion engine can be further improved.

An automobile according to the invention may include an auxiliary device and an auxiliary device control device as the power input/output/consumption device. In this case, the auxiliary device may include a secondary battery capable of obtaining electric power which is generated by converting a part of the power from the internal combustion engine. Further, the auxiliary device control device may include a device that controls inputting and outputting of electric power of the secondary battery. Some automobiles with this configuration may set the target power based on the operation requirement of the auxiliary device. In this case, the operation requirement of the auxiliary device may include a charge requirement of the secondary battery. Some automobiles with this configuration may include a state of charge detecting device that detects a state of charge of the secondary battery. Further, the charge requirement of the secondary battery may be made based on the state of charge of the secondary battery that has been detected.

In addition, an automobile according to the aspect may include a power transmission conversion mechanism capable of transmitting a part of the power from the internal combustion engine to the drive shaft, and capable of converting the remaining power to electric power so as to supply it to the power input/output/consumption device. The power transmission conversion mechanism in an automobile with this configuration includes a generator that generates electric power due to an input of the power from the internal combustion engine, and a three-axes type power input/output mechanism. The three-axes type power input/output mechanism has a first axis connected to an output shaft of the internal combustion engine, a second axis and a third axis each connected to a rotational axis of the generator, in which the power which is input to and output from any two axes of the three determines the power which is input to and output from the remaining axis. The power transmission conversion mechanism may include an electric motor capable of outputting a power directly to the third axis.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF THE PREFERRED EMBODIMENT

Figure 1:
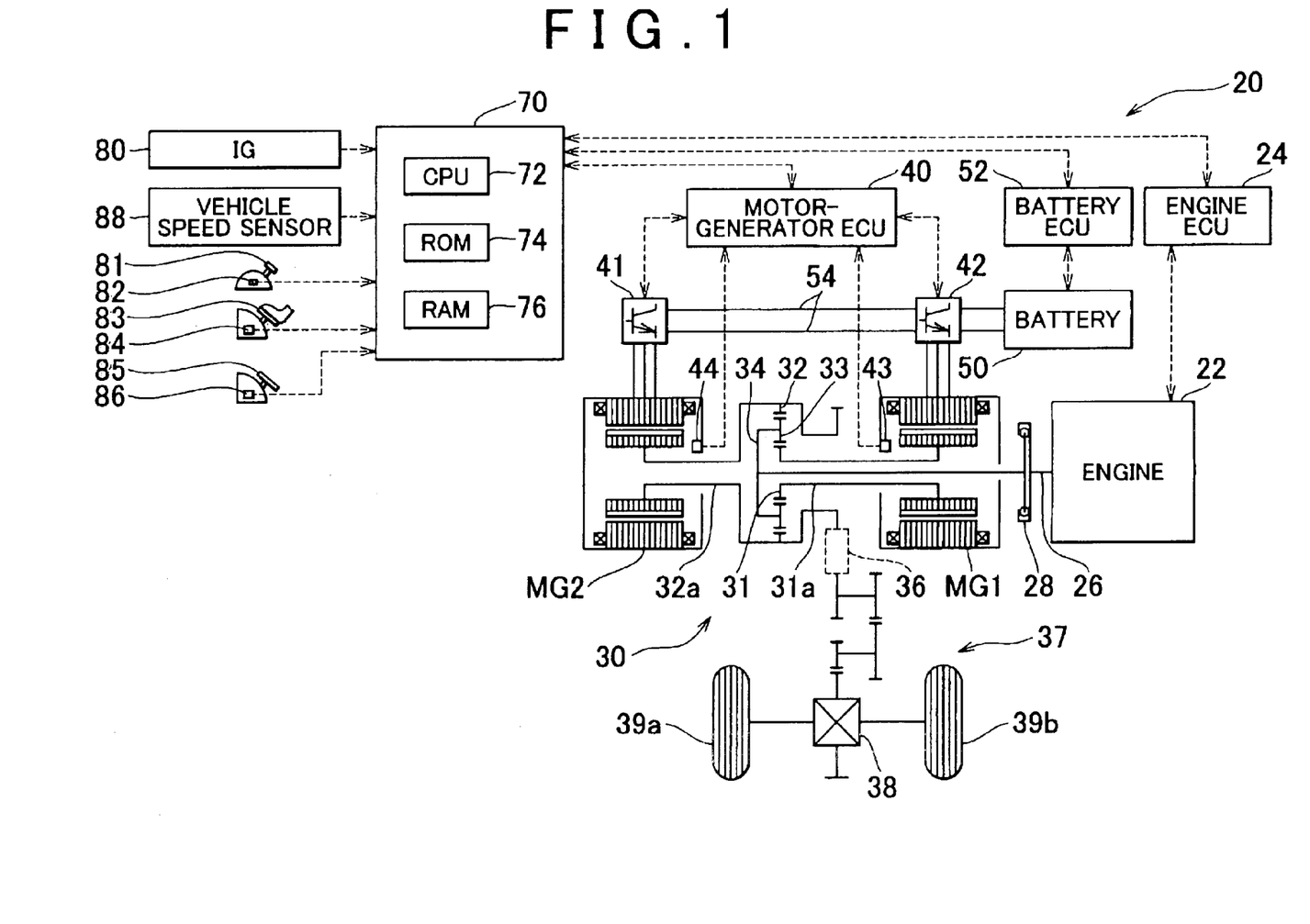
FIG. 1 is a schematic view of a configuration of a hybrid automobile according to one embodiment of the invention.

Hereafter, an embodiment of the invention will be explained. FIG. 1 is a schematic view of a configuration of a hybrid automobile 20 according to one embodiment of the invention. As shown in the figure, the hybrid automobile 20 according to the present embodiment includes an engine 22, a three-axes type power input/output mechanism 30 connected via a damper 28 to a crank shaft 26 that serves as an output shaft of the engine 22, a motor-generator MG1 which is capable of generating electric power and connected to the power input/output mechanism 30, a motor-generator MG2 which is also connected to the power input/output mechanism 30, a battery 50 that serves as an auxiliary device which exchanges electric power between the motor-generator MG1 and the motor-generator MG2, and an electronic control unit for the hybrid (hereinafter referred to as a hybrid ECU) 70 that controls the whole driving system of a vehicle.

The engine 22 is an internal combustion engine which outputs power using hydrocarbon fuel such as gasoline and light oil. The engine 22 is subject to an operation control such as a fuel injection control, an ignition control, and an intake air amount regulation control by an electronic control unit for the engine (hereafter referred to as an engine ECU) 24. The engine ECU 24 receives signals from various sensors detecting an operational state of the engine 22. The engine ECU 24 communicates with the hybrid ECU 70, and controls the operation of the engine 22 based on a control signal from the hybrid ECU 70. Further, if necessary, the engine ECU 24 outputs a data related to an operational state of the engine 22 to the hybrid ECU 70.

Figure 2:
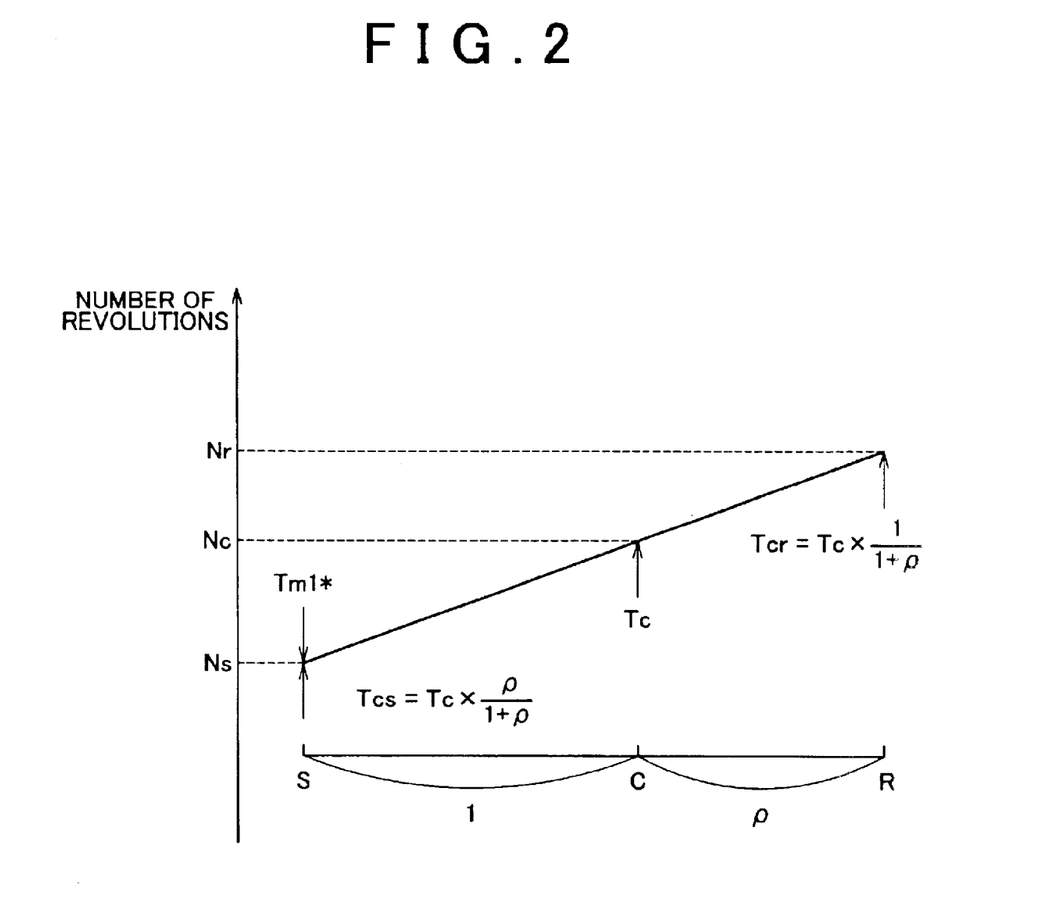
FIG. 2 is a drawing showing a relation of a number of revolutions Ns of a sun gear axis, a number of revolutions Nr of a ring gear axis, and a number of revolutions Nc of a carrier.

The power input/output mechanism 30 includes a sun gear 31 which is an external gear, a ring gear 32 which is an inner gear and disposed concentrically with the sun gear 31, a plurality of pinion gears 33 which mesh with both the sun gear 31 and the ring gear 32, and a carrier 34 which holds the plurality of pinion gears 33 so as to allow them to rotate and revolve. These members constitute a planetary gear mechanism that executes a differential action using the sun gear 31, the ring gear 32, and the carrier 34 as rotational elements. FIG. 2 shows a relation of a number of revolutions Ns of the sun gear 31, a number of revolutions Nr of the ring gear 32, and a number of revolutions Nc of the carrier 34. When, a torque Tc is input to the carrier 34, it is distributed to the sun gear 31 as a torque Tcs and to the ring gear 32 as a torque Tcr. FIG. 2 also shows the torque Tcs and the torque Tcr. As shown in the figure, assuming a gear ratio of the planetary gear 30 to be ρ (a ratio of the number of teeth of the sun gear 31 to the number of teeth of the ring gear 32), the number of revolutions Nc of the carrier 34 may be expressed by the following formula (1), using the number of revolutions Ns of the sun gear 31 and the number of revolutions Nr of the ring gear 32 as shown in FIG. 2.

[Equation 1]

$$Nc=Ns\cdot\rho/(1+\rho)+Nr\cdot 1/(1+\rho) \quad (1)$$

In addition, the torque Tcs and the torque Tcr which are output to the sun gear 31 and the ring gear 32, respectively, when the torque Tc is input to the carrier 34, can be expressed by the following formulae (2), (3) using the gear ratio ρ.

[Equation 2]

$$Tcs=Tc\cdot\rho(1+\rho) \quad (2)$$

$$Tcr=Tc\cdot 1\ (1+\rho)=Tcs/\rho \quad (3)$$

In the power input/output mechanism 30, the crank shaft 26 of the engine 22 is connected to the carrier 34, the motor-generator MG1 is connected to the sun gear 31, and the motor-generator MG2 is connected to the ring gear 32, respectively. Accordingly, when the motor-generator MG1 functions as a generator, the power of the engine 22 which is input through the carrier 34 is distributed into the sun gear 31 side and the ring gear 32 side in accordance with the gear ratio ρ thereof. On the other hand, when the motor-generator MG1 functions as an electric motor, the power of the engine 22 which is input through the carrier 34 and the power of the motor-generator MG1 which is input through the sun gear 31 are integrated and output to the ring gear 32. In addition, the ring gear 32 is mechanically connected to the driving wheels 39a, 39b of the vehicle via a belt 36, a gear mechanism 37, and a differential gear 38. Therefore, the power that has been output to the ring gear 32 is output to the driving wheels 39a, 39b via the belt 36, the gear mechanism 37, and the differential gear 38. When the power input/output mechanism 30 is to be considered as a driving system, the three axes connected to the power input/output mechanism 30 are the crank shaft 26 which is connected to the carrier 34 and serves as an output shaft of the engine 22; a sun gear axis 31a which is connected to the sun gear 31 and serves as a rotational axis of the motor-generator MG1; and a ring gear axis 32 which is connected to the ring gear 32 and serves as a drive shaft and mechanically connected to the driving wheels 39a, 39b.

The motor-generator MG1 and the motor-generator MG2 are configured as a known synchronous motor-generator in which both motor-generators can be driven as a generator, and also be driven as an electric motor. They exchange electric power with the battery 50 through the inverters 41, 42. Electric power lines 54 which connect the inverters 41, 42 and the battery 50 are configured as an anode bus line and a cathode bus line that are shared by the inverters 41, 42. Accordingly, electric power generated by one of the motor-generators MG1, MG2 can be consumed by the other motor-generator. Therefore, the battery 50 is charged and discharged using the electric power generated by the motor-generators MG1, MG2 and the electric power in shortage. Note that if balance of the electric power is maintained by the motor-generator MG1 and the motor-generator MG2, the battery 50 will not be charged or discharged. Driving of both motor-generators MG1, MG2 is controlled by an electronic control unit 40 for the motor-generator (hereinafter referred to as a motor-generator ECU 40). The motor-generator ECU 40 receives signals required for controlling the drive of the motor-generators MG1, MG2. Examples of the signals include a signal from the rotational position detection sensors 43, 44 that detect a rotational position of a rotor of the motor-generators MG1, MG2, and a phase current detected by a current sensor, not shown, and applied to the motor-generators MG1, MG2. The motor-generator ECU 40 outputs switching control signals to the inverters 41, 42. The motor-generator ECU 40 calculates numbers of revolutions Nm1, Nm2 of rotors of the motor-generators MG1, MG2 using a number of revolutions calculation routine, not shown, based on the signals input from the rotational position detection sensors 43, 44. The numbers of revolutions Nm1, Nm2 correspond to the number of revolutions Ns of the sun gear axis 31a and the number of revolutions Nr of the ring gear axis 32a, because the motor-generator MG1 is connected to the sun gear 31 and the motor-generator MG2 is connected to the ring gear 32, respectively. The motor-generator ECU 40 communicates with the hybrid ECU 70, controls drive of the motor-generators MG1, MG2 based on a control signal from the hybrid ECU 70, and, if necessary, outputs a data related to an operational state of the motor-generators MG1, MG2 to the hybrid ECU 70.

The battery 50 is managed by an electronic control unit for the battery (hereinafter referred to as a battery ECU) 52. The battery ECU 52 receives signals required for managing the battery 50. Examples of the signals include a voltage between terminals from a voltage sensor, not shown, arranged between two terminals of the battery, current for charge and discharge from a current sensor, not shown, installed in the electric power line 54 connected to an output terminal of the battery 50, and a battery temperature from the temperature sensor, not shown, installed to the battery 50. If necessary, the battery ECU 52 outputs data related to a state of the battery 50 to the hybrid ECU 70 by communication. In addition, the battery ECU 52 calculates a state of charge (SOC) based on a sum of the charged and discharged current detected by the current sensor and the voltage between the terminals detected by the voltage sensor in order to manage the battery 50.

The hybrid ECU 70 is configured as a microprocessor mainly by a CPU 72. The hybrid ECU 70 includes an ROM 74 which stores a processing program, an RAM 76 which temporarily stores data, and an I/O port and a communication port, not shown. The hybrid ECU 70 receives an ignition signal, a shift position SP from a shift position sensor 82 that detects an operational position of a shift lever 81, an accelerator opening Adrv from an accelerator pedal position sensor 84 that detects the accelerator opening Adrv corresponding to an amount of depression of an accelerator pedal 83, a brake pedal position BP from a brake pedal position sensor 86 that detects a depression amount of a brake pedal 85, and the vehicle speed V from a vehicle speed sensor 88 via the input port. As described above, the hybrid ECU 70 is connected to the engine ECU 24, the motor-generator ECU 40, and the battery ECU 52 via a communication port so as to exchange various control signals and data with the engine ECU 24, the motor-generator ECU 40, and the battery ECU 52.

In the hybrid automobile 20 as configured above according to the embodiment, a torque requirement which has to be output to the ring gear axis 32a that serves as a drive shaft is calculated based on the vehicle speed V and the accelerator opening Adrv that corresponds to the amount of depression of the accelerator pedal 83 by a driver. Next, operation of the engine 22, the motor-generator MG1, and the motor-generator MG2 is controlled such that the power requirement corresponding to the torque requirement is output to the ring gear axis 32a. Examples of the operation control by the engine ECU 24, the motor-generator ECU 40, and the battery ECU 52 include a normal operation mode, a charge operation mode, a discharge operation mode, and a motor-generator operation mode. In the normal operation mode, operation of the engine 22 is controlled such that the engine 22 outputs a power corresponding to the power requirement. At the same time, drive of the motor-generator MG1 and the motor-generator MG2 is controlled such that all power that is output from the engine 22 is converted to torque by the power input/output mechanism 30, the motor-generator MG1, and the motor-generator MG2, and further output to the ring gear axis 32a. In the charge operation mode, operation of the engine 22 is controlled such that the engine 22 outputs a power equivalent to a sum of the power requirement and the electric power required for charging the battery 50 when the state of charge SOC of the battery 50 is less than a value Sl. Also, the drive of the motor-generator MG1 and the motor-generator MG2 is controlled such the power that is output from the engine 22 while charging the battery 50 is converted to a torque by the power input/output mechanism 30, the motor-generator MG1, and the motor-generator MG2, and further output to the ring gear axis 32a. On the other hand, in the discharge operation mode, operation of the engine 22 is controlled such that the engine 22 outputs a power equivalent to a difference between the power requirement and the discharged electric power of the battery 50 when the state of charge SOC of the battery 50 is equal to or more than a value Sh. Also, the drive of the motor-generator MG1 and the motor-generator MG2 is controlled such the power that is output from the engine 22 while discharging the battery 50 is converted to a torque by the power input/output mechanism 30, the motor-generator MG1, and the motor-generator MG2, and further output to the ring gear axis 32a. In the motor-generator operation mode, operation is controlled such that the operation of the engine 22 is stopped at a relatively low vehicle speed, and a power corresponding to the torque requirement by the motor-generator MG2 is output to the ring gear axis 32a.

Figure 3:
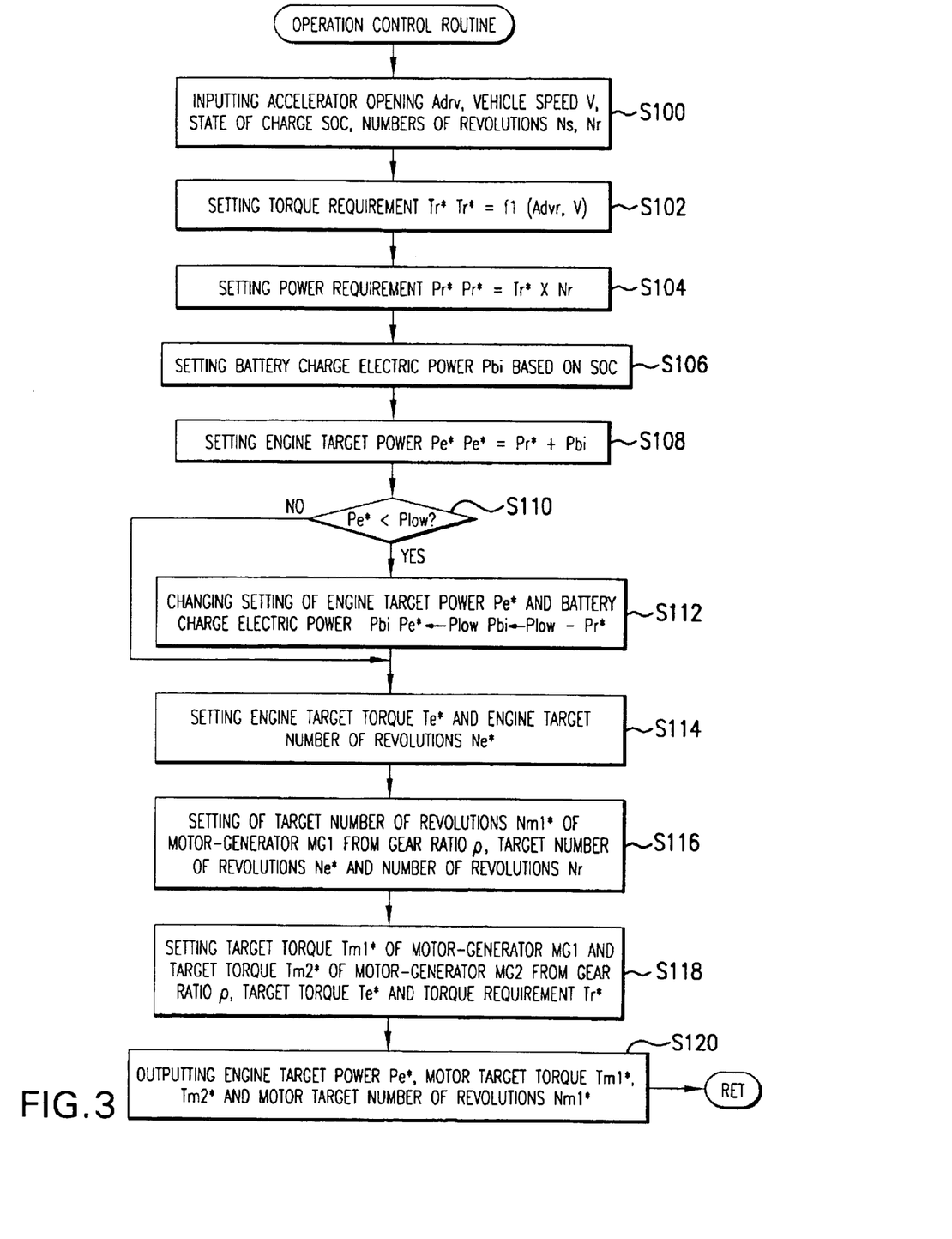
FIG. 3 is a flow chart showing an example of an operation control routine executed by a hybrid electronic control unit of a hybrid automobile according to an embodiment of the invention.

Hereafter, operation of the hybrid automobile 20 according to the embodiment will be explained. FIG. 3 is a flow chart showing an example of an operation control routine executed by the hybrid ECU 70 according to the embodiment. This routine is executed repeatedly at every predetermined period of time (such as at every 20 msec), when, for example, the normal operation mode or the charge operation mode is set as the operation mode described above.

Figure 4:
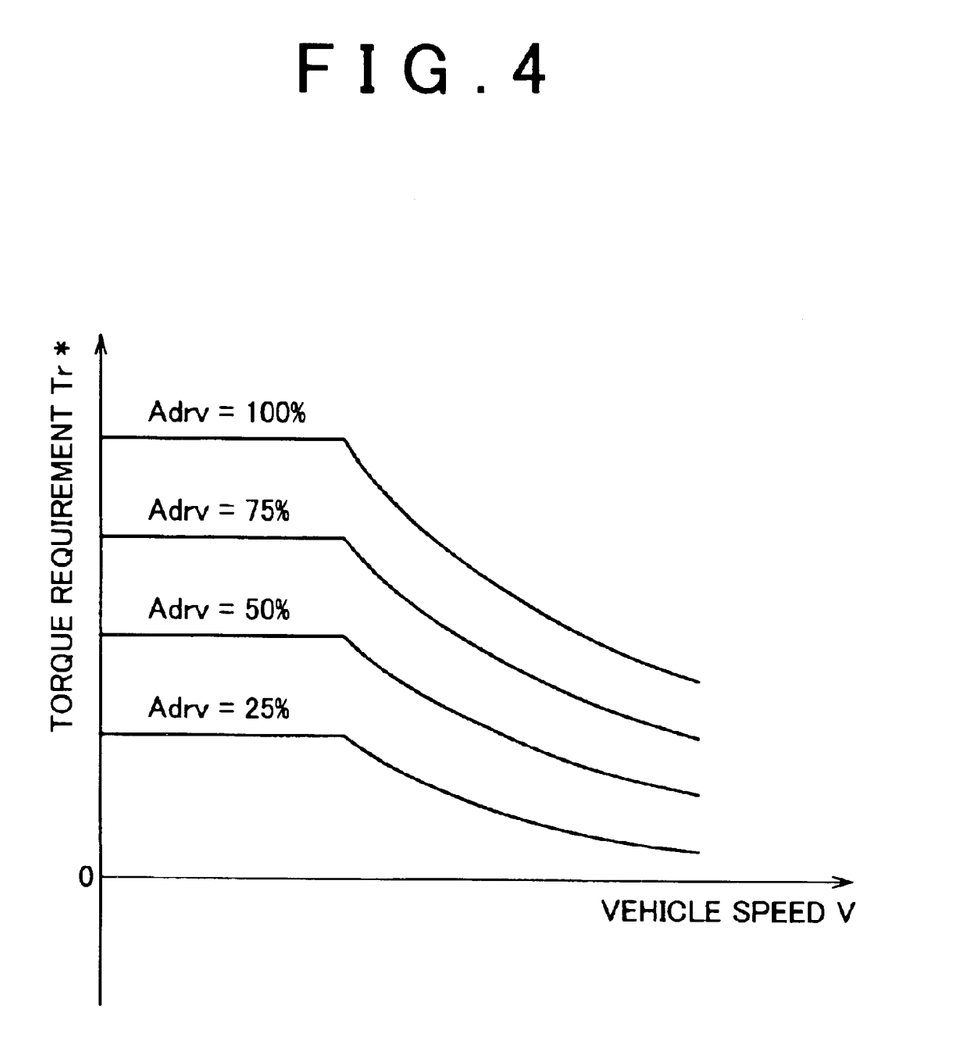
FIG. 4 is a map showing a relation of an accelerator opening Adrv, a vehicle speed V, and a torque requirement Tr* of a drive shaft.

The operation control routine is executed as follows. First, the CPU 72 of the hybrid ECU 70 executes processing of reading the accelerator opening Adrv from the accelerator pedal position sensor 84, the vehicle speed V from the vehicle speed sensor 88, the state of charge SOC of the battery 50 that is calculated by the battery ECU 52 and input through communication, and numbers of revolutions Ns, Nr of the sun gear axis 31a and the ring gear axis 32a that are calculated by the motor-generator ECU 40 and input thereto through communication (step S100). Next, the CPU 72 executes processing of setting the torque requirement Tr* of the ring gear axis 32a that serves as a drive shaft based on the accelerator opening Adrv and the vehicle speed V (step S102). In the embodiment, this processing is executed by predetermining a relation of the accelerator opening Adrv, the vehicle speed V, and the torque requirement Tr* and storing them as a torque requirement setting map in the ROM 74. Next, when the accelerator opening Adrv and the vehicle speed V are given, the corresponding torque requirement Tr* is derived from the torque requirement setting map. An example of the map is shown in FIG. 4.

After the torque requirement Tr* is set, the CPU 72 sets a power requirement Pr* of the drive shaft (i.e., the ring gear axis 32a) by multiplying the torque requirement Tr* and the number of revolutions Nr of the ring gear axis 32a (step S104). Further, the CPU 72 sets a battery charge electric power Pbi based on the state of charge SOC of the battery 50 that has been read (step S106). Further, the CPU 72 sets the engine target power Pe* by adding the power requirement Pr* and the battery charge electric power Pbi that have been set (step S108).

Figure 5:
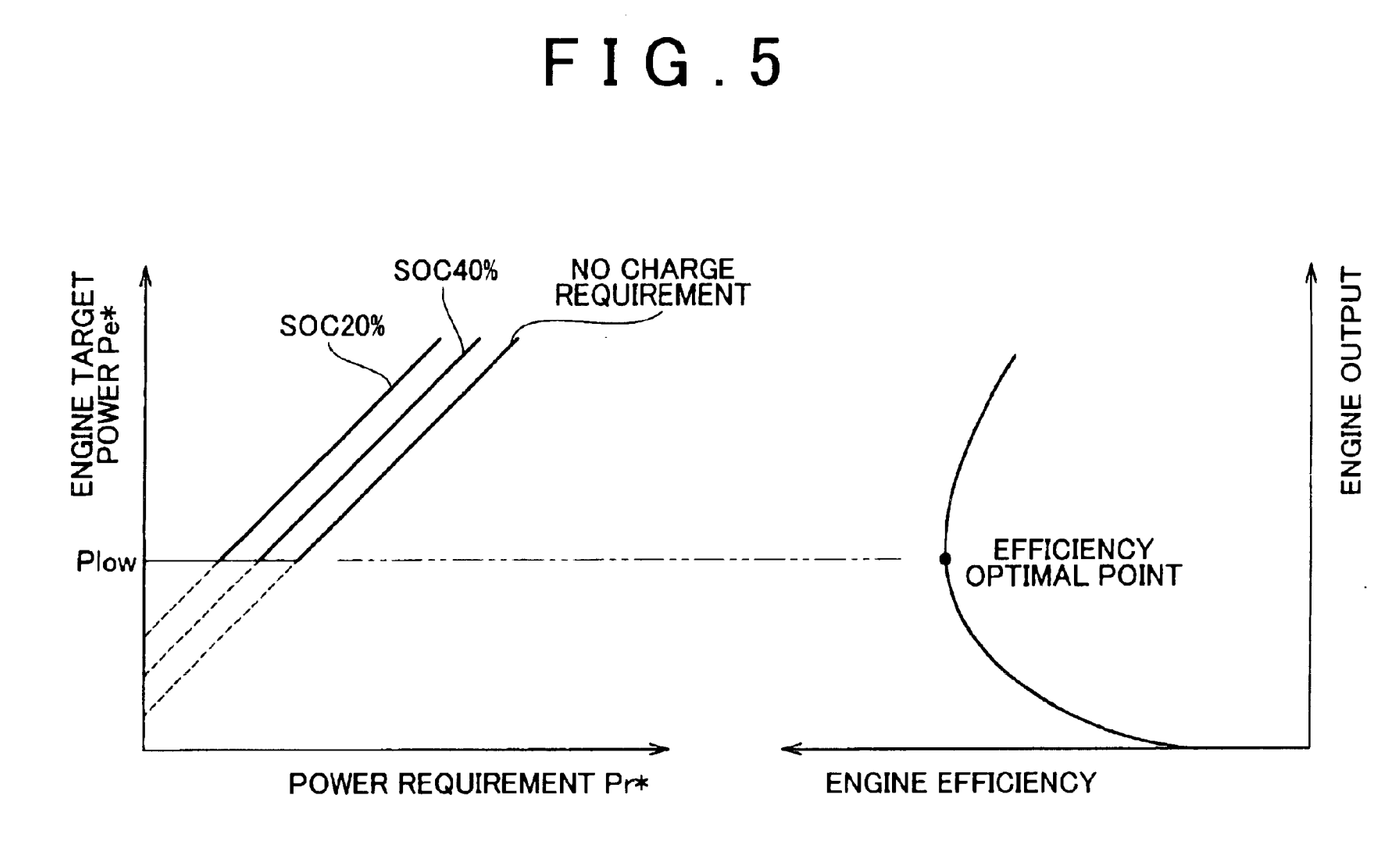
FIG. 5 is a map showing a relation of a power requirement Pr* of the drive shaft, a state of charge SOC of a battery, and an engine target power Pe*.

After setting the engine target power Pe*, the CPU 72 determines whether or not the engine target power Pe* is less than a predetermined minimum value Plow (step S110). When it determines that the engine target power Pe* is less than the predetermined minimum value Plow, the CPU 72 executes processing of changing the setting of the engine target power Pe* and charge electric power Pbi that have been set in steps S106, S108, respectively (step S112). Specifically, the CPU 72 changes the setting of the engine target power Pe* to the minimum value Plow, and of the battery charge electric power Pbi to a value obtained by subtracting the power requirement Pr* from the minimum value Plow. In this embodiment, the engine target power Pe* and the battery charge electric power Pbi are set or setting thereof are changed by calculation processing in steps S106 to S112. However a map may be used, in place of the calculation processing in steps S106 to S112. Specifically, a relation of the power requirement Pr* of the drive shaft, the state of charge SOC of the battery 50, and the engine target power Pe* is predetermined and stored in the ROM 74 as a engine target power setting map. Next, when the power requirement Pr* and the state of charge SOC are given, the corresponding engine target power Pe* is derived from the engine target power setting map. Further, the battery charge electric power Pbi may be set as a value obtained by subtracting the power requirement Pr* of the drive shaft from the engine target power Pe* that has been derived. FIG. 5 shows an example of the engine target power setting map. The relation between the engine output and the engine efficiency is also shown in FIG. 5. Here, the engine efficiency is expressed as an engine efficiency with respect to the engine output assuming that that the engine 22 is operated at an operating point where the efficiency of the engine is the highest (i.e. an operating point determined from the torque and the number of revolutions). The minimum value Plow of the engine target power Pe* in step S110 and shown in FIG. 5 is set to be an output value when efficiency of the engine 22 is the highest. This setting is based on the fact that, if the engine 22 is operated in an output range less than the minimum value Plow, the engine efficiency (fuel economy) decreases, and degree of the efficiency change with respect to the output change of the engine 22 is also large, causing efficiency (fuel economy) to be unstable. Accordingly, by setting the engine target power Pe* at or greater than the minimum value Plow, fuel economy can be improved and stabilized. Note that, an excessive power which may be generated by the engine 22 caused by the setting of the engine target power Pe* at the minimum value Plow is converted to electric power by the motor-generator MG1, and charged to the battery 50. There may be a case where electric power may be charged to the battery 50 even when the normal operation mode is set as an operation mode. However, since the state of charge SOC of the battery 50 is within the range from the value S1 to the value Sh in the normal operation mode, the battery 50 is not hypercharged. Therefore, even in this case, electric charge may be permitted.

When the engine target power Pe* is set, the CPU 72 sets the target torque Te* and the target number of revolutions Ne* as an operating point at which the engine 22 can be operated most efficiently with the target power Pe* (i.e. the operating point to be determined from the torque and the number of revolutions) (step S114). Next, the CPU 72 calculates the target number of revolutions Nm1 of the motor-generator MG1 from the gear ratio ρ of the power input/output mechanism 30, the target number of revolutions Ne* of the engine 22 (i.e. the number of revolutions Nc of the carrier 34), and the number of revolutions Nr of the ring gear axis 32a (step S116). As described above, there is a relation as shown in formula (1) between the number of revolutions Ns of the sun gear 31, the number of revolutions Nc of the carrier 34, and the number of revolutions Nr of the ring gear 32. Further, the crank shaft 26 of the engine 22 and the motor-generator MG1 are connected to the carrier 34 and the sun gear 31, respectively. Therefore, it is possible to calculate the number of revolutions Ns of the sun gear 31 using the formula (1) from the target number of revolutions Ne* of the engine 22 that corresponds to the number of revolutions Nc of the carrier 34, the number of revolutions Nr of the ring gear 32, and the gear ratio ρ. Further, it is possible to set the calculated number of revolutions Ns of the sun gear 31 as the target number of revolutions Nm1* of the motor-generator MG1.

After setting the target number of revolutions Nm1* of the motor-generator MG1, the target torque Tm1*, Tm2* of the motor-generators MG1, MG2 are set based on the gear ratio ρ of the planetary gear 30 (step S118). The target torque Tm1* of the motor-generator MG1 may be set so as to be balanced with the torque Tcs which is distributed to the sun gear 31 when the target torque Te* of the engine 22 is input to the carrier 34 as the torque Tc, as the relation between each torque is shown in FIG. 2. That is, the target torque Tm1* of the motor-generator MG1 may be calculated using the following formula (4) assuming that the target torque Tm1* is a value of which plus or minus of the torque Tcs is reversed. On the other hand, the target torque Tm2* of the motor-generator MG2 may be calculated using the following formula (5) such that the torque requirement Tr* that has been set in step S102 is output to the ring gear 32, while considering the torque Tcr (=Tcs/ρ) that is directly distributed from the engine 22.

[Equation 3]

$$Tm1^* = -Te^* \cdot \rho/(1+\rho) \tag{4}$$

$$Tm2^* = Tr^* - Te^* \cdot 1/(1+\rho) \tag{5}$$

As described above, the target power Pe* and the target torque Te* of the engine 22, the target torque Tm1* and the target number of revolutions Nm1* of the motor-generator MG1, and the target torque Tm2* of the motor-generator MG2 are set respectively. After this, the ECU 72 commands the engine ECU 24 such that the engine 22 outputs the target torque Te*, and commands the motor-generator ECU 40 such that the motor-generator MG1 is driven with the target torque Tm1* and at the target number of revolutions Nm1* and such that the motor-generator MG2 is driven at the target torque Tm2* (step S120). Then this routine exits. The engine ECU 24 that received these commands controls the operation of the engine 22 such that the engine 22 outputs a torque equivalent to the target torque Te*. Further, the motor-generator ECU 40 which received these commands controls the number of revolutions of the motor-generator MG1 such that the motor-generator MG1 rotates at the target number of revolutions Nm1*, while outputting the target torque Tm1*. At the same time, the motor-generator ECU 40 controls the motor-generator MG2 such that the motor-generator MG2 rotates at the target number of revolutions Nm1*, while outputting a torque equivalent to the target torque Tm2*.

In the hybrid automobile 20 according to the present embodiment as explained above, the minimum value Plow is set for the engine target power Pe* so as to prohibit the engine 22 from being operated in a low output range where the efficiency with respect to the output of the engine 22 is poor and the efficiency change with respect to the output change of the engine 22 is large. Accordingly, the efficiency of the engine 22 is improved and stabilized. As a result, fuel economy of the engine 22, and even of the hybrid automobile 20 can be further improved, and stabilized. Further, the set minimum value Plow is a value when the efficiency with respect to the output of the engine 22 is optimal, the fuel economy of the engine 22 (the hybrid automobile 20) can be further improved. In addition, it is possible to charge the battery 50 using a surplus power that is generated because of setting the engine target power Pe* at the minimum value Plow.

In the hybrid automobile 20 according to the embodiment, the operation control routine of FIG. 3 is executed when the operation mode is the charge operation mode or the normal operation mode. However, it is also possible that the operation control routine is not executed in the normal operation mode.

In the hybrid automobile 20 according to the embodiment, the minimum value Plow of the engine target power Pe* is set to an output value of the engine 22 when the efficiency with respect to the output of the engine 22 is optimal. However, the minimum value Plow may be set such that the engine is operated such that the degree of the efficiency change with respect to the output change of the engine 22 is smaller than a predetermined value. Alternatively, the minimum value Plow may be set such that the engine is operated such that the efficiency change with respect to the output change of the engine 22 is larger than the predetermined value.

In the hybrid automobile 20 according to the embodiment, the engine target power Pe* is based on the power requirement Pr*, while taking into consideration the charge requirement (the state of charge SOC) of the battery 50 that serves as the auxiliary device. However, the engine target power Pe* may be set taking into consideration an operation requirement of another auxiliary device that is operated using power from the engine 22 directly or indirectly, such as a driving requirement of a compressor of an air-conditioning device.

In the hybrid automobile 20 according to the embodiment, the sum of the battery charge electric power Pbi that has been set based on the engine target power Pe* and the battery charge electric power Pbl that has been set based on the state of charge SOC is obtained. Then, the engine target power Pe* is changed to the minimum value Plow regardless of the battery charge electric power Pbl if the sum is less than the minimum value Plow. On the other hand, the engine target power Pe* remains unchanged when the sum is equal to or more than the minimum value Plow. However, the engine target power Pe* may also be changed to the minimum value Plow regardless of the state of charge SOC, when the engine target power Pe* that has been set based on the power requirement Pr* is less than the minimum value Plow. On the other hand, the engine target power Pe* may be changed by adding the battery charge electric power Pbi which has been set based on the state of charge SOC to the engine target power Pe*, if the engine target power Pe* is equal to or more than the minimum value Plow.

In the hybrid automobile 20 according to the embodiment, after setting the engine target power Pe*, the target operating point at which the engine 22 can be operated efficiently (that is, the engine target torque Te* and the engine target number of revolutions Ne*) is determined. However, it may also be possible to directly set the target operating point without setting the engine target power Pe*.

Figure 6:
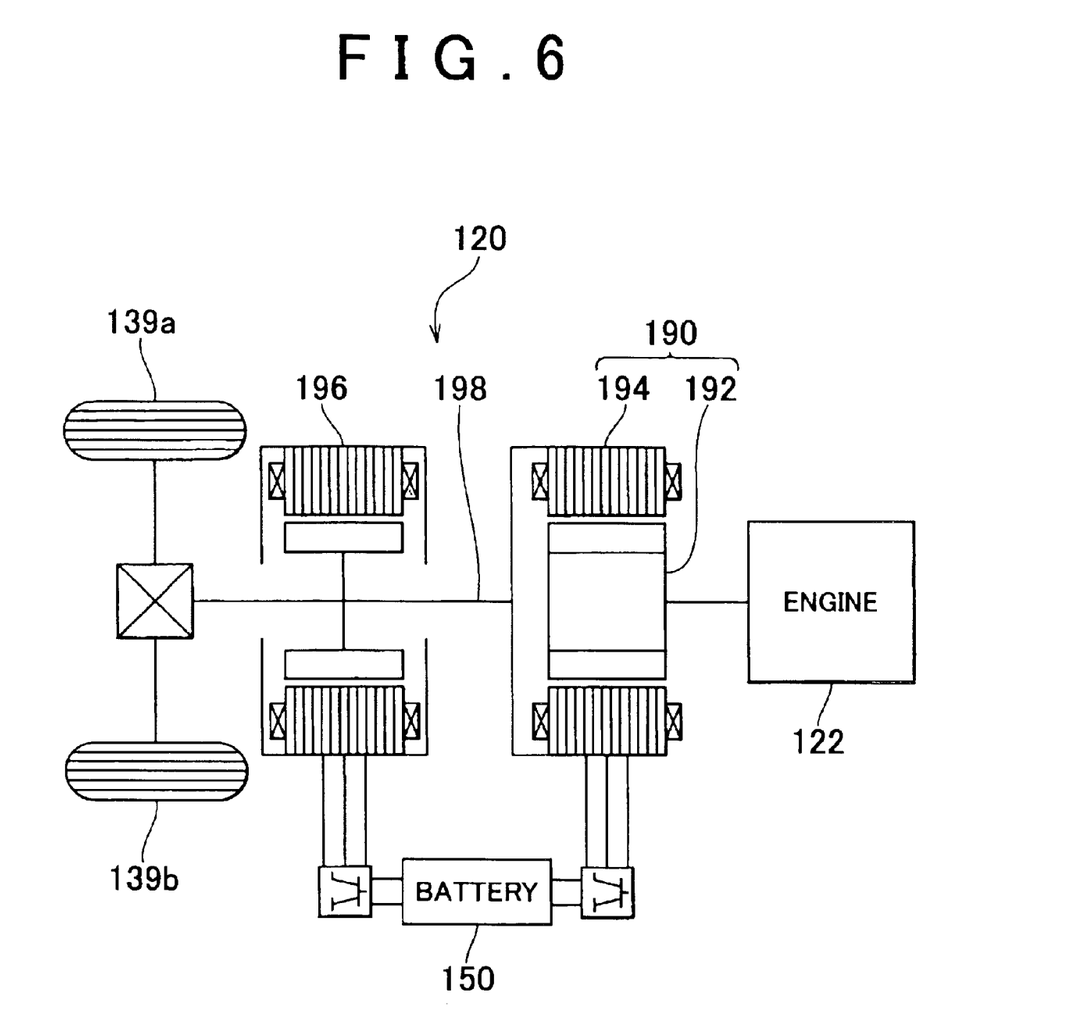
FIG. 6 is a schematic view of a configuration of a hybrid automobile according to a modification.
Figure 7:
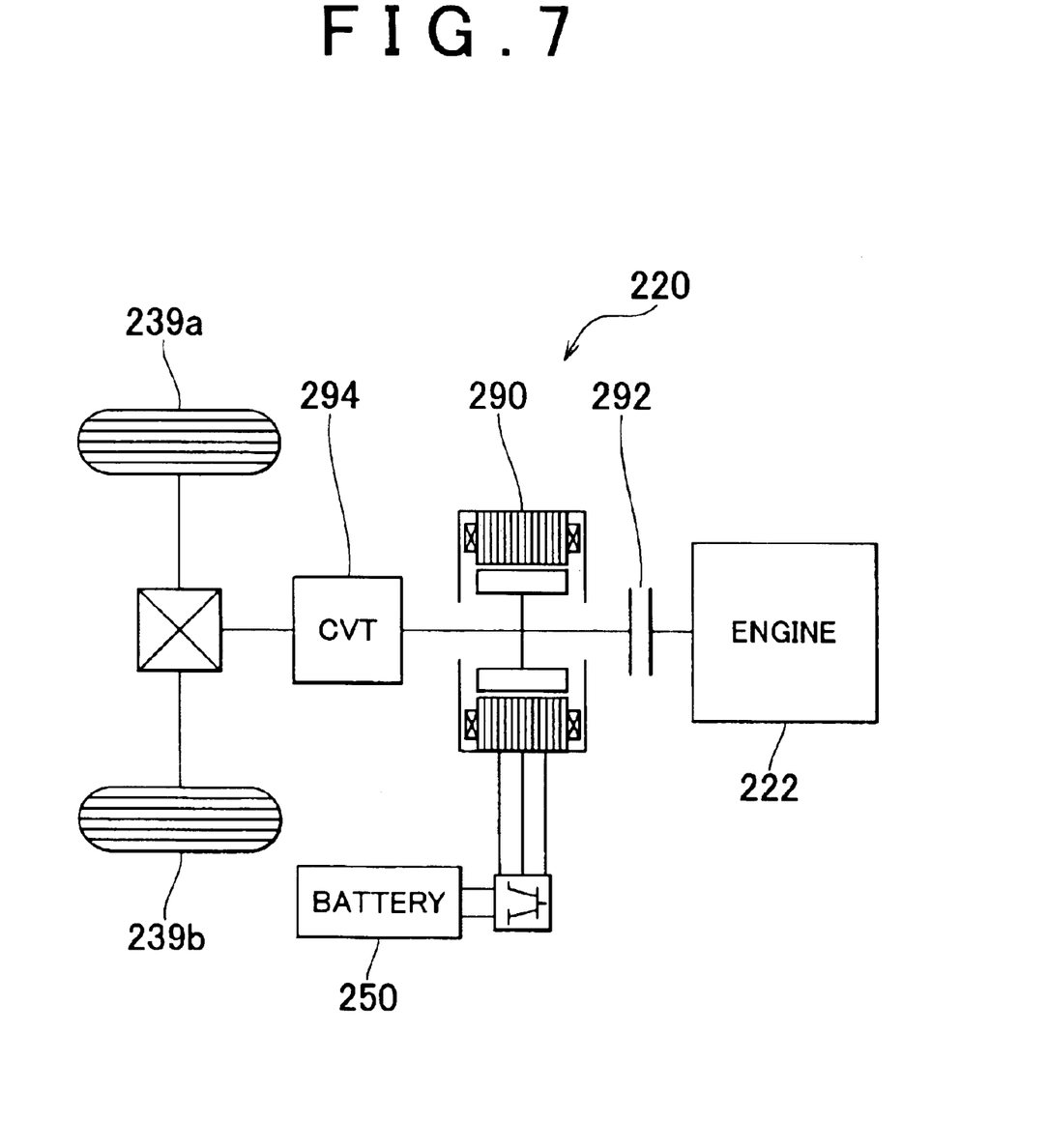
FIG. 7 is a schematic view of configuration of a hybrid automobile according to another modification.

The hybrid automobile 20 according to the embodiment is configured by the engine 22, the three-axes type power input/output mechanism 30 connected to the output shaft (the crank shaft 26) of the engine 22, the motor-generator MG1 capable of generating an electric power and connected to the power input/output mechanism 30, and the motor-generator MG2 connected to the power input/output mechanism 30 and to the drive shaft (the ring gear axis 32a) that is connected to the driving wheels 39a, 39b. However, the invention may be applied to any hybrid automobile as long as the hybrid automobile can run utilizing power from an internal combustion engine and power from an electric motor and as long as it has an auxiliary device (including a secondary battery) which is operable by using at least a part of the power from the internal combustion engine directly or indirectly. For example, the invention may be applied to a hybrid automobile which includes an engine, a three-axes type power input/output mechanism connected to the output shaft of the engine, a motor-generator capable of generating an electric power and connected to the power input/output mechanism, and a transmission (such as a continuously variable transmission). Further, the invention may be applied to a hybrid automobile 120, as shown in FIG. 6, which includes an engine 122, a motor 190 which includes an inner rotor 192 connected to an output shaft of the engine 122 and an outer rotor 194 installed to a drive shaft 198 connected to driving wheels 139a, 139b, and relatively rotates by electromagnetic effect of the inner rotor 192 and the outer rotor 194, and a motor 196 which is mechanically connected to the drive shaft so as to be capable of outputting power directly to the drive shaft 198. Moreover, the invention may be applied to a hybrid automobile 220, as shown in FIG. 7, which includes an engine 222, a motor 290 connected to an output shaft of the engine 222 via a clutch 292, and a transmission (such as a continuous variable transmission) connected to a rotational axis of the electric motor 290 and a drive shaft connected to driving wheels 239a, 230b. Further, the invention may be applied to an automobile other than a hybrid automobile as long as it includes a mechanism capable of inputting, outputting or consuming a power which is equivalent to a deviation between the power from the engine and the power requirement to be output to the drive shaft.

As set forth above, an embodiment of the invention was explained. However, the invention is not limited to the embodiment and modifications, and it is obvious that the invention may be embodied in various modifications as long as they do not deviate from the scope of the invention.

What is claimed is:

1. An automobile including an internal combustion engine capable of outputting a power to a drive shaft comprising:
   a target power setting device that sets a target power to be output by the internal combustion engine or a target operating point based on a power requirement to be output to the drive shaft and a characteristic of an efficiency with respect to an output of the internal combustion engine;
   an operation control device that controls operation of the internal combustion engine such that the internal combustion engine is operated with the target power or at the target operating point that has been set; and
   a power input/output/consumption device that inputs, outputs, or consumes a power which is equivalent to a difference between the power requirement and either one of the target power and a power corresponding to the target operating point.

2. The automobile according to claim 1, wherein the power input/output/consumption device includes an auxiliary device that is operated by using at least a part of the power from the internal combustion engine directly or indirectly, and an auxiliary device control device that controls operation of the auxiliary device.

3. The automobile according to claim 2, wherein the target power setting device further sets the target power or the target operating point based on an operation requirement of the auxiliary device.

4. The automobile according to claim 1, wherein the target power setting device sets the target power or the target operating point such that an efficiency with respect to the output of the internal combustion engine is within a predetermined tolerance range.

5. The automobile according to claim 1, wherein the target power setting device sets the target power or the target operating point based on a characteristic of a change in efficiency with respect to a change in the output of the internal combustion engine, as a characteristic of the efficiency with respect to the output of the internal combustion engine.

6. The automobile according to claim 5, wherein the target power setting device sets the target power or the target operating point such that the internal combustion engine is operated within an output range in which a degree of change in the efficiency with respect to a change in the output of the internal combustion engine is small.

7. The automobile according to claim 5, wherein the target power setting device sets a predetermined power or a predetermined target operating point regardless of the power requirement, when the target power which has been set based on the power requirement or a power corresponding to the target operating point that has been set is within an output range in which a degree of change in the efficiency with respect to a change in the output of the internal combustion engine is large.

8. The automobile according to claim 7, wherein the predetermined power or the predetermined operating point is set to a power or an operating point when the efficiency of the internal combustion engine has reached a predetermined high level.

9. The automobile according to claim 3, wherein:
the target power setting device sets the target power or the target operating point based on a characteristic of a change in efficiency with respect to a change in output of the internal combustion engine, as a characteristic of the efficiency with respect to the output of the internal combustion engine; and
the target power setting device sets a predetermined power or a predetermined operating point regardless of the power requirement and the operation requirement of the auxiliary device, when the target power which has been set based on the power requirement and the operation requirement of the auxiliary device or a power corresponding to the target operating point that has been set is within a range where a degree of a change in efficiency with respect to the change in output of the internal combustion engine is large.

10. The automobile according to claim 9, wherein the predetermined power or the predetermined operating point is set to a power or an operating point when the efficiency of the internal combustion engine has reached a predetermined high level.

11. The automobile according to claim 3, wherein:
the target power setting device sets the target power or the target operating point such that the internal combustion engine is operated in an output range where a degree of a change in efficiency with respect to a change in output of the internal combustion engine is small; and
the target power setting device sets a predetermined power or a predetermined operating point regardless of the power requirement and the operation requirement of the auxiliary device, when the target power that has been set based on the power requirement and the operation requirement of the auxiliary device or a power corresponding to the target operating point is within an output range where a degree of a change in efficiency with respect to a change in output of the internal combustion engine is large.

12. The automobile according to claim 11, wherein the predetermined power or the predetermined operating point is set to a power or an operating point when the efficiency of the internal combustion engine has reached a predetermined high level.

13. The automobile according to claim 2, wherein:
the auxiliary device includes a secondary battery capable of obtaining an electric power which is generated by converting a part of the power from the internal combustion engine; and
the auxiliary device control device includes a device to control inputting and outputting of the electric power of the secondary battery.

14. The automobile according to claim 3, wherein:
the auxiliary device includes a secondary battery capable of obtaining an electric power which is generated by converting a part of the power from the internal combustion engine;
the auxiliary device control device includes a device to control inputting and outputting of the electric power of the secondary battery; and
the operation requirement of the auxiliary device includes a charge requirement of the secondary battery.

15. The automobile according to claim 14, further comprising:
a state of charge detecting device that detects a state of charge of the secondary battery, wherein
the charge requirement of the secondary battery is executed based on a detected state of charge of the secondary battery.

16. The automobile according to claim 1, further comprising:
a power transmission conversion mechanism capable of transmitting a part of the power from the internal combustion engine to the drive shaft, and capable of converting a remaining power to an electric power so as to supply the electric power to the power input/output/consumption device.

17. The automobile according to claim 14, wherein:
the power transmission conversion mechanism includes a generator that generates an electric power due to an input of the power from the internal combustion engine, and a three-axes type power input/output mechanism that has a first axis connected to an output shaft of the internal combustion engine, a second axis and a third axis each connected to a rotational axis of a generator, and the power which is input to and output from any two axes of the first axis, the second axis and the third axis determines the power which is input to and output from the remaining axis; and
the automobile includes an electric motor capable of outputting a power directly to the third axis.

18. An automobile including an internal combustion engine capable of outputting a power to a drive shaft, comprising:
target power setting means for setting a target power to be output by the internal combustion engine or a target operating point based on a power requirement to be output to the drive shaft and a characteristic of an efficiency with respect to an output of the internal combustion engine;
operation control means for controlling operation of the internal combustion engine such that the internal combustion engine is operated with the target power or at the target operating point that has been set; and
power input/output/consumption means for inputting, outputting, or consuming a power which is equivalent to a difference between the power requirement and either one of the target power and a power corresponding to the target operating point.

19. A controlling method for an automobile including an internal combustion engine capable of outputting a power to a drive shaft, comprising the steps of:
setting a target power to be output by the internal combustion engine or a target operating point based on a power requirement to be output to the drive shaft and a characteristic of an efficiency with respect to an output of the internal combustion engine;
controlling operation of the internal combustion engine such that the internal combustion engine is operated with the target power or at the target operating point that has been set; and
inputting, outputting, or consuming a power which is equivalent to a difference between the power requirement and either one of the target power and a power corresponding to the target operating point.

* * * * *